United States Patent
Görlich et al.

(10) Patent No.: US 10,732,823 B2
(45) Date of Patent: Aug. 4, 2020

(54) USER INTERFACE AND METHOD FOR THE PROTECTED INPUT OF CHARACTERS

(71) Applicants: SIEMENS AKTIENGESELLSCHAFT, München (DE); WINCOR NIXDORF INTERNATIONAL GMBH, Paderborn (DE)

(72) Inventors: Jürgen Görlich, Marienfeld (DE); Matthias Lindemann, Paderborn (DE); Michael Nolte, Brakel (DE); Klaus-Peter Wegge, Paderborn (DE)

(73) Assignee: AEVI INTERNATIONAL GMBH, Paderborn (DE)

(*) Notice: Subject to any disclaimer, the term of this patent is extended or adjusted under 35 U.S.C. 154(b) by 275 days.

(21) Appl. No.: 15/531,757

(22) PCT Filed: Nov. 6, 2015

(86) PCT No.: PCT/EP2015/075896
§ 371 (c)(1),
(2) Date: May 31, 2017

(87) PCT Pub. No.: WO2016/087157
PCT Pub. Date: Jun. 9, 2016

(65) Prior Publication Data
US 2017/0269828 A1    Sep. 21, 2017

(30) Foreign Application Priority Data
Dec. 2, 2014   (DE) .................. 10 2014 224 676

(51) Int. Cl.
*G06F 3/0488*   (2013.01)
*G06F 21/31*   (2013.01)
(Continued)

(52) U.S. Cl.
CPC .......... *G06F 3/04883* (2013.01); *G06F 3/016* (2013.01); *G06F 21/31* (2013.01);
(Continued)

(58) Field of Classification Search
CPC ...... G06F 3/04883; G06F 3/016; G06F 21/31; G06F 21/83001; G06F 21/007;
(Continued)

(56) References Cited

U.S. PATENT DOCUMENTS 5,970,146 A * 10/1999 McCall ................. G06F 3/0416
345/173
2007/0298785 A1   12/2007 Lee
(Continued)

FOREIGN PATENT DOCUMENTS

WO            0242891 A2      5/2002
WO     WO 0242891 A2      5/2002

OTHER PUBLICATIONS

Apple: "VoiceOver für iOS"; [recherchiert am Aug. 27, 2015]; Nov. 25, 2014; <URL:https://web.archive.org/web/20141125185305/http://www.apple.com/de/accessibility/ios/voiceover/>.
(Continued)

*Primary Examiner* — Andrew T Chiusano
(74) *Attorney, Agent, or Firm* — Schmeiser, Olsen & Watts, LLP

(57) ABSTRACT

A simple gesture control system that permits accurate, simple, and secure input of personal identification numbers (PIN) by visually impaired or blind persons at a payment terminal or automatic teller machine is provided. By the user interface, invisible keys can be selected by simple wiping gestures. Here, any necessity for visual or spoken feedback or localization of operating elements is rendered unnecessary. As a result, blind or visually impaired users can input a secret number by touch operation automatically and with-
(Continued)

out outside help. In this way, account is also taken of the statutory requirements in different countries.

32 Claims, 5 Drawing Sheets

(51) Int. Cl.
*G07F 7/10* (2006.01)
*G06F 21/83* (2013.01)
*G09B 21/00* (2006.01)
*G07C 9/33* (2020.01)
*G06F 3/01* (2006.01)

(52) U.S. Cl.
CPC ............... *G06F 21/83* (2013.01); *G07C 9/33* (2020.01); *G07F 7/1033* (2013.01); *G09B 21/001* (2013.01); *G09B 21/007* (2013.01); *G06F 2221/031* (2013.01)

(58) Field of Classification Search
CPC ............... G06F 2221/031; G06F 21/83; G07C 9/00142; G07C 9/33; G07F 7/1033; G09B 21/001; G09B 21/007
See application file for complete search history.

(56) References Cited

U.S. PATENT DOCUMENTS

| | | | | |
|---|---|---|---|---|
| 2010/0222095 | A1 | 9/2010 | Yamashita et al. | |
| 2011/0148774 | A1* | 6/2011 | Pihlaja | G06F 3/04883 345/173 |
| 2011/0246927 | A1* | 10/2011 | Im | G06F 3/0236 715/773 |
| 2012/0050179 | A1* | 3/2012 | Harrow | G06F 3/04883 345/173 |
| 2012/0075192 | A1* | 3/2012 | Marsden | G06F 3/04886 345/168 |
| 2013/0263251 | A1* | 10/2013 | Fleizach | G06F 3/04883 726/19 |

OTHER PUBLICATIONS

"Die Gesten zur Erkundung und Steuerung von iPhone und iPad; Tabelle der Gesten und ihre Wirkung" <URL:http://www.apfelschule.ch/index.php/anleitungen-fuer-das-selbstaendig>; [recherchiert an Aug. 27, 2015] zuletzt aktualisiert am Dienstag, Dec. 10, 2013.
PCT International Search Report dated Jan. 28, 2016 corresponding to PCT International Application No. PCT/EP2015/075896 filed Nov. 6, 2015.
Office Action of the German Patent and Trademark Office dated Sep. 24, 2015 corresponding to the German Patent Application No. 10 2014 224 676.8.

* cited by examiner

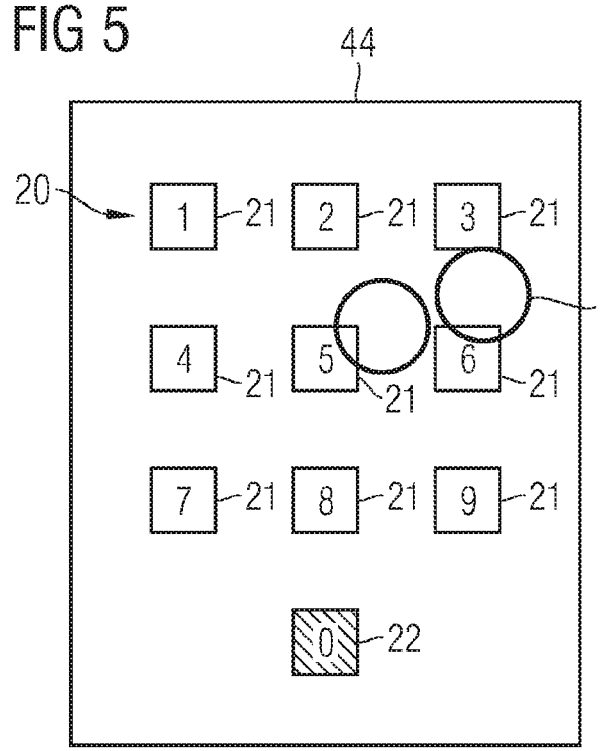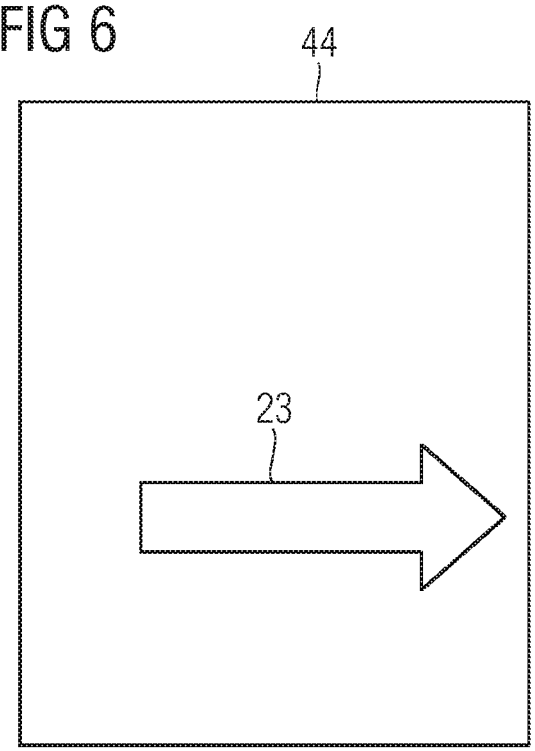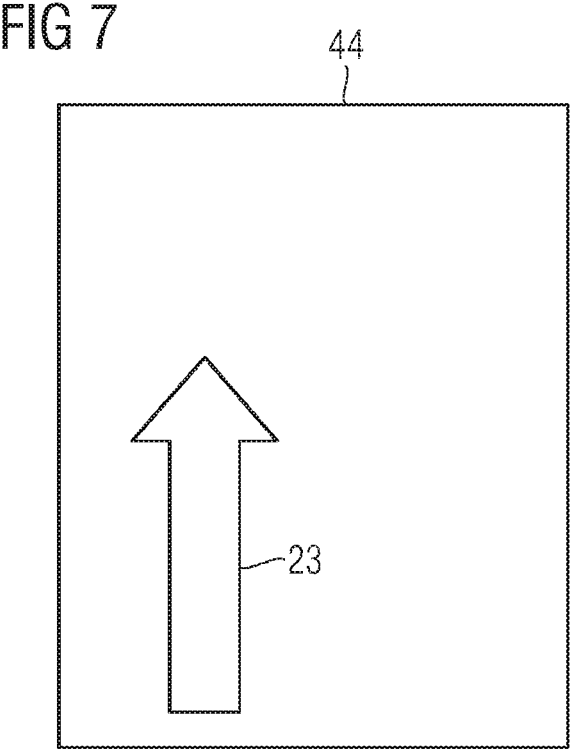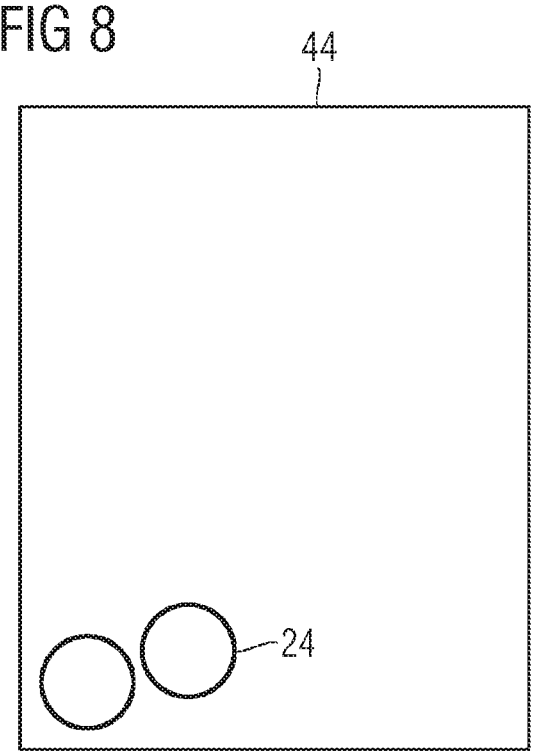

FIG 9
FIG 10
FIG 11
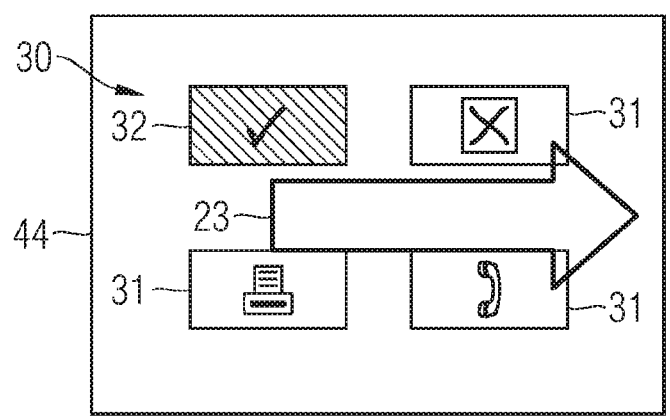
FIG 12
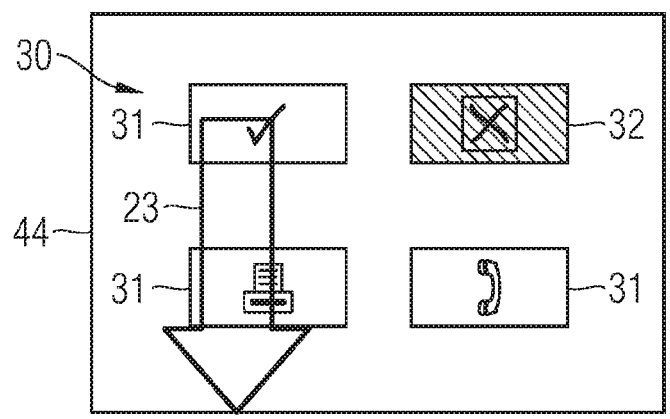
FIG 13

USER INTERFACE AND METHOD FOR THE PROTECTED INPUT OF CHARACTERS

CROSS-REFERENCE TO RELATED APPLICATIONS

This application claims priority to PCT Application No. PCT/EP2015/075896, having a filing date of Nov. 6, 2015, which is based upon and claims priority to DE Application No. 10 2014 224 676.8, having a filing date of Dec. 2, 2014 the entire contents both of which are hereby incorporated by reference.

FIELD OF TECHNOLOGY

The following is intended to provide a user interface and a method for the protected input of characters by visually impaired or blind persons which allow an intuitive input of characters that is largely protected vis-à-vis observers.

BACKGROUND

With the changeover from mechanical keyboards to a touch-based operation by touchpads, touchscreens or multi-touchscreens, the problem arises that the keyboard, its layout and the individual keys and the pressure points thereof are no longer tangible. As a result, inputs by visually impaired or blind persons are made particularly difficult since learnable tactile orientation points are no longer present on a flat touchpad or touchscreen.

SUMMARY

An aspect relates to a user interface comprising an operating element having a touch-sensitive surface. The user interface is characterized by one processor or a plurality of processors programmed for providing an invisible keyboard, which defines an arrangement of invisible keys, exactly one of which is selected at each point in time, wherein the invisible keys are allocated respectively a character which can be input by the respective invisible key, and wherein no visual or acoustic output of a position or assignment of the selected invisible key is provided during a protected input mode. The processor or the processors are furthermore programmed for identifying a touch input which can be performed in the protected input mode as a swipe gesture in an arbitrary region on the touch-sensitive surface of the operating element. They are furthermore programmed for selecting an invisible key which is arranged alongside the previously selected invisible key on the invisible keyboard in a direction analogous to a direction of the swipe gesture.

In the method, an operating element has a touch-sensitive surface. The method is characterized in that one processor or a plurality of processors provide(s) an invisible keyboard, which defines an arrangement of invisible keys, exactly one of which is selected at each point in time, wherein the invisible keys are allocated respectively a character which can be input by the respective invisible key, and wherein no visual or acoustic output of a position or assignment of the selected invisible key is provided during a protected input mode. The processor or the processors identifies (identify) a touch input which can be performed in the protected input mode as a swipe gesture in an arbitrary region on the touch-sensitive surface of the operating element. Furthermore, the processor or the processors select(s) an invisible key which is arranged alongside the previously selected invisible key on the invisible keyboard in a direction analogous to a direction of the swipe gesture.

On the computer-readable data carrier there is stored a computer program which performs the method when it is processed in one processor or a plurality of processors.

The computer program is processed in one processor or a plurality processors and performs the method in the process.

The access system, the self-service terminal, the checkout system, the payment terminal, the automatic teller machine, the transfer terminal, the automated parcel station, the smartphone, the tablet, the laptop and the personal computer in each case have the user interface.

The term character is understood to mean for example letters, digits and special characters, such as are defined for example in the character sets ASCII or Unicode. The term character may also be understood to mean other character sets comprising neither the Roman alphabet nor the ten Arabic digits. Furthermore, the characters may be not just displayable characters, but also non-printable control characters. Furthermore, the character may also be understood in the sense of a function of a button, such as "OK" or "Cancel", for instance. In one frequent case of application, digits such as are used for example in telephone numbers, account numbers or access codes are used as characters. Each invisible key is assigned a character which can be input by said invisible key.

The functions of the user interface are provided by one or a plurality of processors. In one variant, a single processor is programmed to carry out all the steps of the method. In another variant, a first processor is provided in order to process the touch inputs, while a second processor is programmed in order to select the invisible key. All of the functions described in the exemplary embodiments can thus be provided by one processor alone, by a plurality of processors jointly or by division of work among a plurality of processors. The processors can be incorporated as microprocessors for example in computers, terminals or mobile terminals, but they can also be part of microcontrollers.

The user interface and the method are suitable for all systems which are controlled via a touch-sensitive surface. These also include, in particular, user interfaces with a multi-touchscreen. The simple gesture control of the user interface and of the method can be used for example for the input of personal identification numbers (PIN) by visually impaired or blind persons at a payment terminal or automatic teller machine.

The user interface and the method represent a departure from the customary paradigm of user guidance on touchscreens, which considers the advantage of the touchscreen to be precisely that of enabling hand-eye coordination by virtue of a user touching the touchscreen exactly at the location at which a corresponding button is visualized. The swipe gesture, by contrast, can be performed in an arbitrary region on the touch-sensitive surface.

In all assistance systems for visually impaired or blind persons, the prior art involves an acoustic output of the selected key or button (screenreader function). There is a departure from this, too, by virtue of the visual and acoustic output of the selected invisible key being suppressed. By way of example, a multi-touchscreen may remain dark or blank during a PIN input, such that an observer cannot assign swipe gestures directly to the digits that are input. The selected digits of the PIN are also not output acoustically by the system.

The user interface and the method respectively make use of a metaphor which a user can use as a mental model for control. In accordance with the metaphor, a coin lies on the selected invisible key, which coin can be shifted to neighboring invisible keys by the swipe gestures. Consequently, exactly one invisible key is selected at each point in time, which invisible key can be actuated for example by a tap gesture in an arbitrary region on the touch-sensitive surface, as a result of which the corresponding character is input.

The swipe gesture is performed over a short distance, for example. In one embodiment, said distance can be at least 3 cm. It can be performed in horizontal and vertical directions, but also in a diagonal direction. Diagonal swipe gestures enable the corresponding invisible keys to be selected particularly rapidly. Since a plurality of swipe gestures can also be performed one after another, the selection of the invisible key can be modified as often as desired.

In accordance with one embodiment, the selection of the invisible key is separated from the actuation thereof by virtue of the fact that a dedicated touch input, here a tap gesture, is required for actuating the selected invisible key. This has the advantage that a user can firstly explore the user interface before carrying out an actual character input.

In accordance with one embodiment, the user interface and the method enable visually impaired or blind users to input a PIN accurately, simply and securely.

The method can be implemented on conventional hardware already available. The user interface is designed according to reliable and user-centered guidelines. It makes it possible to select the invisible keys by simple swipe gestures. This obviates any need for visual or spoken feedback or localization of operating elements. As a result, blind or visually impaired users are enabled to input a secret number by touch operation independently and without outside assistance. The legal requirements in different countries are also taken into account as a result.

BRIEF DESCRIPTION

Some of the embodiments will be described in detail, with reference to the following figures, wherein like designations denote like members, wherein:

FIG. 1 shows a user interface comprising an operating element 43 comprising a touch-sensitive surface 44, which makes it possible to select invisible keys 21 of an invisible keyboard 20 by horizontal and vertical swipe gestures;

FIG. 5 shows a touch-sensitive surface 44 on which a tap gesture 24 is performed;

FIG. 6 shows a touch-sensitive surface 44 on which a horizontal swipe gesture 23 is performed;

FIG. 7 shows a touch-sensitive surface 44 on which a vertical swipe gesture 23 is performed;

FIG. 8 shows a touch-sensitive surface 44 on which a tap gesture 24 is performed;

FIG. 9 shows an invisible keyboard 20, the keys of which are arranged in the layout of a telephone keypad;

FIG. 10 shows an invisible keyboard 20, the keys of which are arranged in the layout of a numeric keypad;

FIG. 11 shows an invisible keyboard 20, the keys of which are arranged in the QWERTY layout;

Figure 14:
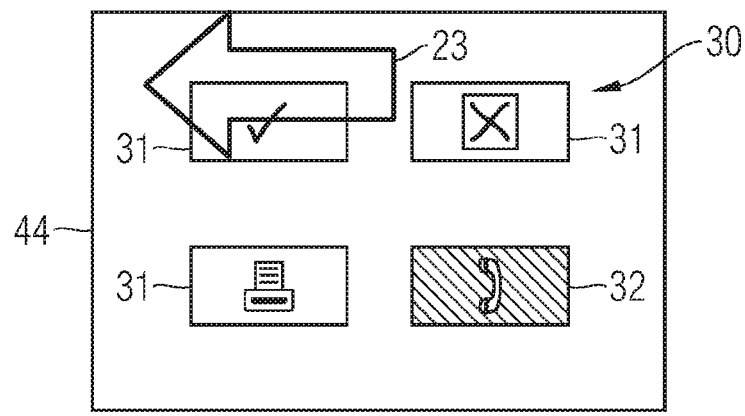
Figure 15:
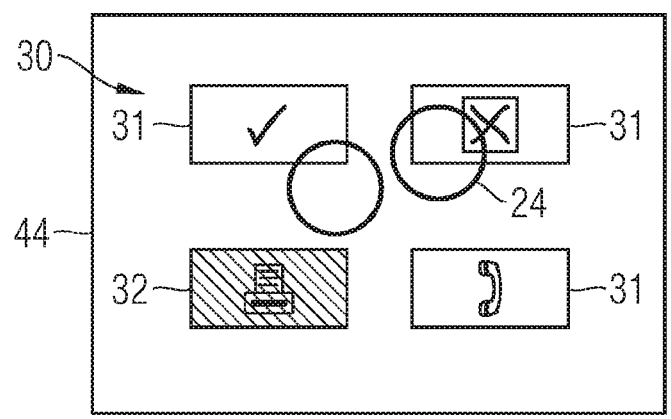
Figure 16:
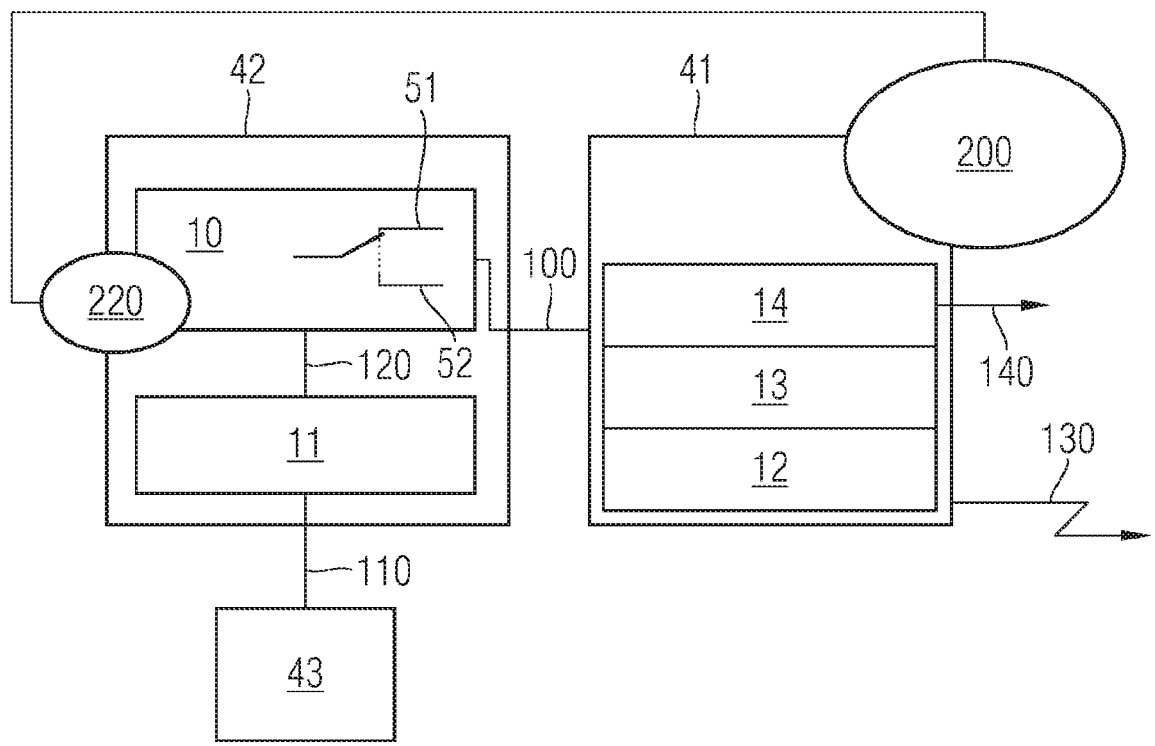

FIG. 12 shows a virtual keyboard 30 having virtual keys 31 arranged on a touchscreen, on the touch-sensitive surface 44 of which a horizontal swipe gesture 23 is performed;

FIG. 13 shows a touch-sensitive surface 44 on which a vertical swipe gesture is performed;

FIG. 14 shows a touch-sensitive surface 44 on which a horizontal swipe gesture 23 is performed;

FIG. 15 shows a touch-sensitive surface 44 on which a tap gesture 24 is performed;

FIG. 16 shows a system architecture of a user interface; and

Figure 17:
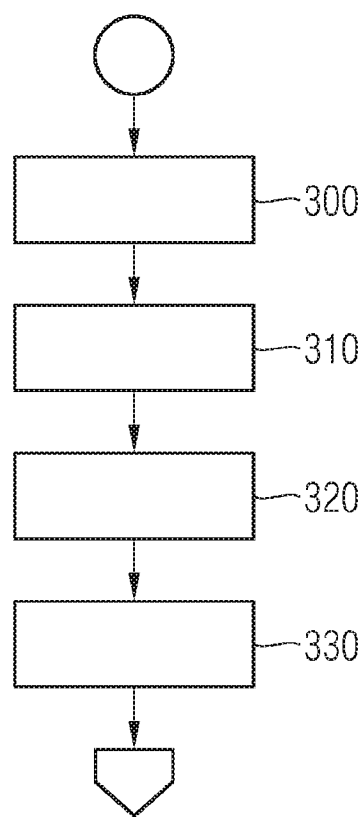

FIG. 17 shows a flow diagram of a computer program.

DETAILED DESCRIPTION

Figure 1:
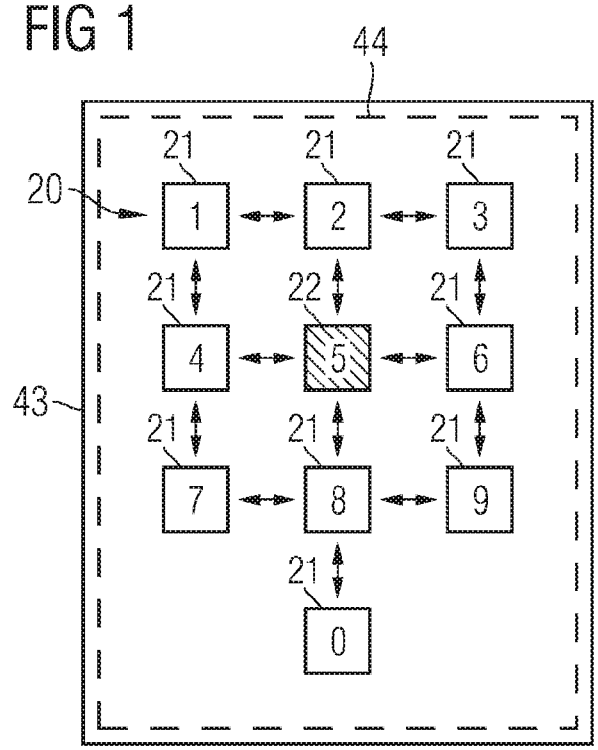

FIG. 1 shows a user interface comprising an operating element 43 comprising a touch-sensitive surface 44, which makes it possible to select invisible keys 21 of an invisible keyboard 20 by horizontal and vertical swipe gestures. The invisible keys 21 are arranged in the layout of a telephone keypad. The invisible key in the center having the digit 5 is a preselected invisible key 22. By horizontal and vertical swipe gestures, which will be explained further below, it is possible to shift the selection from the digit 5 to any of the other invisible keys 21 in accordance with the arrows shown in FIG. 1.

The swipe gestures are performed on a touch-sensitive surface 44 of an operating element 43. The touch-sensitive surface 44 is the active area on which touch inputs and gestures can be correctly evaluated. The touch-sensitive surface 44 can be smaller than a sensory area of the operating element 43. A touch input outside the touch-sensitive surface 44 in the edge region of the sensory area may lead to an acoustic or haptic error message. In the following exemplary embodiments, too, the touch-sensitive surface 44 denotes the active area on which touch inputs and gestures can be correctly evaluated and which do not necessarily fill the complete sensory area of the operating element 43.

Figure 2:
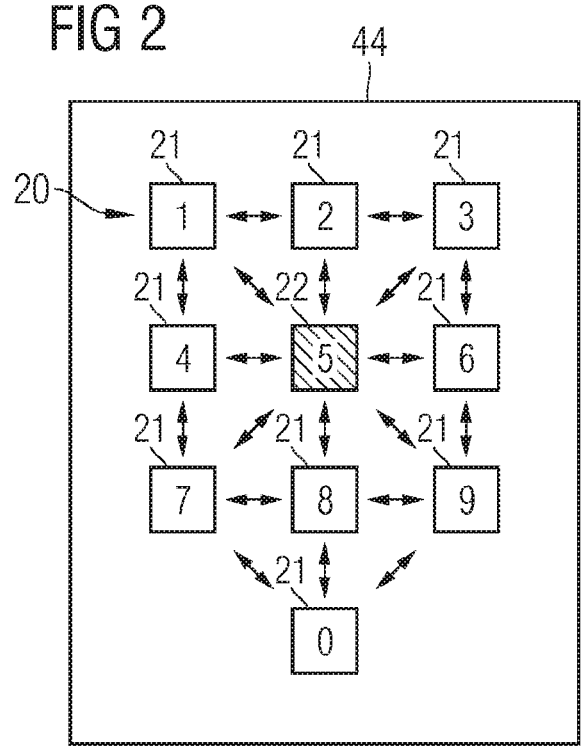
FIG. 2 shows an invisible keyboard 20 having invisible keys 21 which are selectable by means of horizontal, vertical and diagonal swipe gestures.

FIG. 2 shows an invisible keyboard 20 having invisible keys 21 corresponding to FIG. 1, wherein the selection of the selected invisible key 22 can also be shifted by diagonal swipe gestures besides the horizontal and vertical swipe gestures. Diagonal swipe gestures are a possible variant in all of the other exemplary embodiments as well.

Figure 3:
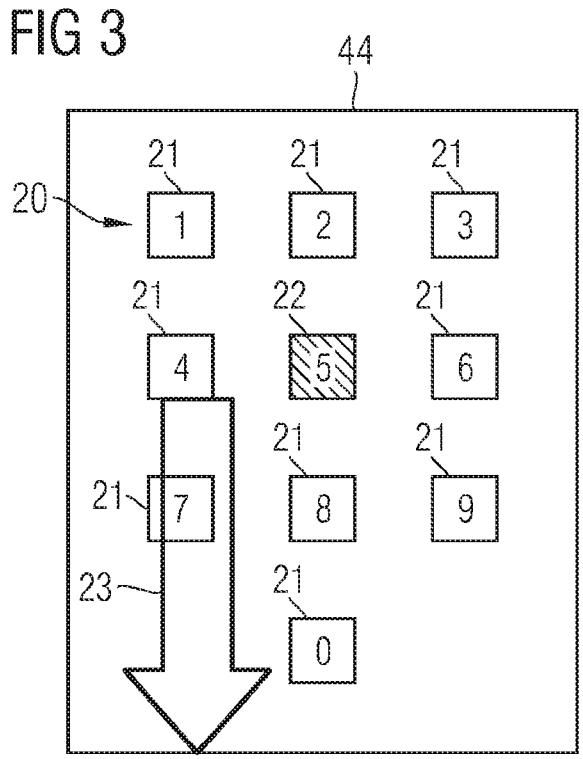
FIG. 3 shows a touch-sensitive surface 44 on which a vertical swipe gesture 23 is performed.

FIG. 3 shows the touch-sensitive surface 44 of an operating element, for example of a touchpad, of a touchscreen or of a multi-touchscreen. The invisible keyboard 20 with its invisible keys 21 and the selected invisible key 22, as depicted in FIG. 3, serves solely for illustration in FIG. 3. On the real user interface, these elements are not depicted on the operating element 43, nor are they output graphically via a touchscreen or a multi-touchscreen, nor are they discernible to a user in any other way. After appropriate training, however, the user has learned a mental model of the invisible keyboard 20, of the invisible keys 21 and of the selected invisible key 22, and the user actively and consciously uses said model for inputting digits by the operating element 43. The invisible keyboard 20 could be temporarily inserted for the purpose of training or for rendering assistance. Conversely, a processor in which the associated computer program runs likewise manages a corresponding model of the invisible keyboard 20, of the invisible keys 21 thereof and of the selected invisible key 22, but the processor does not output said model visually or acoustically to the user via the user interface.

A coin serves as a metaphor for operation, which coin is located on the invisible key having the digit 5 at the beginning of each digit input and can be shifted horizontally, vertically and diagonally onto the other invisible keys 21 by swipe gestures. Theoretically it would be possible to shift the coin with as many swipe gestures as desired on the invisible keyboard 20.

With a simple swipe gesture toward the right or left, the coin proceeding from the digit 5 is slid onto the digit 6 or digit 4. Correspondingly, proceeding from the digit 5, the digit 2 or the digit 8 is reached with a swipe gesture upward or downward. The digits 1, 9, 3 and 7 are reached by corresponding diagonal swipe gestures. Consequently, all digits around the digit 5 are reached with a single swipe gesture. By contrast, no swipe gesture is required for selecting the digit 5, since the coin already lies there at the beginning and after every successful input. Only for the digit 0 is it necessary to swipe downward twice.

When the coin lies on the desired digit, the input of the digit is confirmed by a two-finger tap, i.e. by simple tapping with two fingertips. Afterward, the coin lies on the digit 5 again and the next digit can be selected and confirmed. The digit input is concluded with a long two-finger tap.

A three-finger tap starts the digit input afresh, while a long three-finger tap cancels the transaction. The swipe gestures and tap gestures can be carried out at any desired locations on the touch-sensitive surface 44, which, however, as already explained, may be smaller than the sensory area of the operating element. Neutral sound signals confirm the success of the respective gesture or signal an unrecognized or erroneous gesture. An error is signaled, for example, if the coin lies on the digit 6 and, with a swipe gesture toward the right, an attempt is made to slide said coin beyond the edge of the invisible keyboard 20.

Therefore, if the user performs a swipe gesture which cannot be processed since, in the direction of the swipe gesture, there is no further invisible key 21 available for selection on the invisible keyboard 20, a specific acoustic or haptic signal which indicates this for the user can be output.

As a result, a gesture-based secure digit input in systems with a touchscreen is provided, for example for inputting a PIN at automatic teller machines, self-service terminals, checkout systems, payment terminals, automated parcel stations, transfer terminals or telephones. For feedback, vibrations can also be generated instead of sounds. This method is suitable in particular for blind and visually impaired persons. The system can provide a training mode for the user. Furthermore, information and instructions can be output to the user by voice synthesis.

Reference is made below to a specific operating sequence shown in FIGS. 3 to 5. It was agreed beforehand with the user that, as standard, at the beginning of each digit input, the key having the digit 5 in the center is selected as selected invisible key 22. In the example shown in FIG. 3, the user would like to select the invisible key 21 having the digit 0.

Since the invisible keyboard 20 is not represented, the user can place a swipe gesture 23 vertically from top to bottom at any desired location on the touch-sensitive surface 44, which need not correspond in any way to the layout of the invisible keyboard 20.

Figure 4:
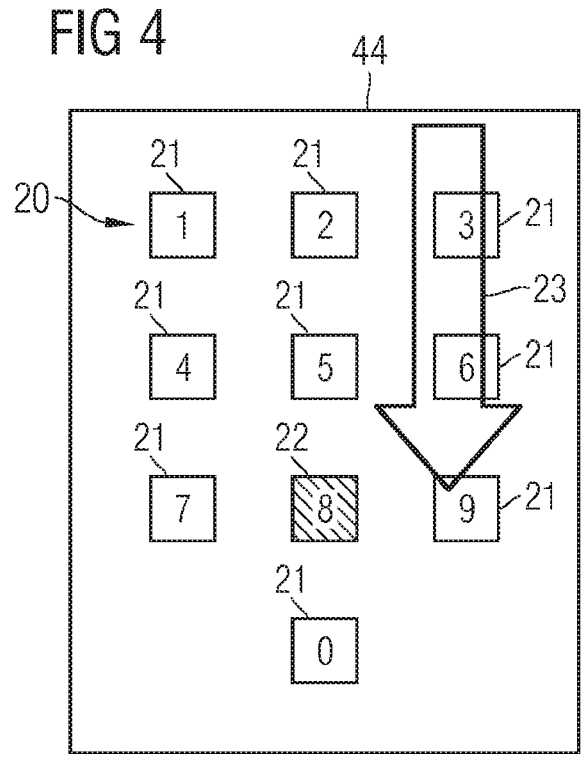
FIG. 4 shows a touch-sensitive surface 44 on which a vertical swipe gesture 23 is performed.

As a result of the swipe gesture 23, the selection is shifted to the invisible key 21 having the digit 8, which is depicted as selected invisible key 22 in FIG. 4. The user then carries out a further vertical swipe gesture 23 from top to bottom on the touch-sensitive surface 44, as a result of which the digit 0 is selected as selected invisible key 22, as is shown in FIG. 5. Since the user would like to input the digit 0, the user then carries out a tap gesture 24—once again at an arbitrary place on the touch-sensitive surface 44—, as a result of which the input of the digit 0 is confirmed.

After confirmation of the input of the digit 0, the selection is reset again to the invisible key 21 having the digit 5. Swipe gestures are thus not required for selecting the digit 5. If this digit is intended to be input next, it suffices to carry out a tap gesture in order to confirm the selection of the invisible key 21 having the digit 5.

FIGS. 6 to 8 show a further operating sequence, in which, to conform with reality to a greater degree, the invisible keyboard 20 is no longer depicted. FIGS. 6 to 8 thus correspond to an interaction experience such as a user would have in reality with the user interface. Here, too, once again the invisible key having the digit 5 is automatically preselected at the beginning of the digit input. The user would like to input the digit 3. For this purpose, the user could simply carry out a diagonal swipe gesture toward the top right on the touch-sensitive surface 44 and subsequently confirm this with a two-finger tap. FIG. 6 shows, in a manner corresponding to FIG. 1, the case where only horizontal and vertical swipe gestures 23 are permissible. In order to attain the digit 3, therefore, the user must firstly perform for example a swipe gesture 23 toward the right on the touch-sensitive surface 44. As a result, the selection is shifted to the invisible key having the digit 6.

The user subsequently carries out a swipe gesture 23 upward on the touch-sensitive surface 44, as is shown in FIG. 7. As a result, the selection is shifted to the invisible key having the digit 3. Since this is the key that the user would like to actuate, in FIG. 8 the user performs a tap gesture 24, a tap with two fingertips in the example shown. The input of the digit 3 is thereby confirmed.

What is important here is that the user interface has a closed functionality, that is to say that it is not possible to acoustically output the currently selected invisible key by screen reader software.

A further exemplary embodiment uses the arrangement of invisible keys 21 explained in the context of FIGS. 1 to 8 for inputting letters analogously to cellular phones which allow an input of letters via the digit keys. For this purpose, the following sequences of letters are assigned to the invisible keys 21:

2: a, b, c
3: d, e, f
4: g, h, i
5: j, k, l
6: m, n, o
7: p, q, r, s
8: t, u, v
9: w, x, y, z

In a text input mode, as standard in each case the first letter from the sequence of letters is assigned to the invisible keys 21. For inputting said first letter, the desired invisible key 22 is selected by swipe gestures as explained in the context of FIGS. 1 to 8. The input of the first letter is then confirmed by a two-finger tap.

In order to select a subsequent letter from the sequence of letters, the respective invisible key 22 is selected by swipe gestures as explained in the context of FIGS. 1 to 8. The user then changes the assignment of the selected invisible key 22 by a one-finger tap, the letter which is currently allocated to the selected invisible key 22 being replaced by that letter from the sequence of letters which succeeds it. This can be repeated as often as desired, wherein after the last letter of the sequence of letters, the first letter of the sequence of letters is once again allocated to the selected invisible key 22. The input of the letter selected from the sequence of letters is subsequently confirmed by a two-finger tap.

After each letter has been input, the selection returns—as explained in the context of FIGS. 1 to 8—to the invisible key 21 which would input the digit 5 in the digit input mode.

In the present exemplary embodiment, it is possible to input the word "hallo" by the following touch inputs:
h: toward the left, one-finger tap, two-finger tap
a: upward, two-finger tap
l: one-finger tap, one-finger tap, two-finger tap
l: one-finger tap, one-finger tap, two-finger tap
o: toward the right, one-finger tap, one-finger tap, two-finger tap FIG. 9 shows an invisible keyboard 20 with a selected invisible key 22, which is additionally extended by the two special characters of a telephone keypad. Such an invisible keyboard 20 is suitable for example for inputting telephone numbers. Proceeding from the invisible key 22 selected as standard, here once again having the digit 5, the invisible keys having the special characters * and # are selectable for example by two vertical and one horizontal swipe gesture (downward, downward, toward the left; downward, downward, toward the right) or by one vertical and one diagonal swipe gesture.

FIG. 10 shows an invisible keyboard 20 whose keys are arranged in accordance with the layout of a numeric keypad. Proceeding from the invisible key 22 selected as standard, here once again having the digit 5, the invisible key having the digit 0 is selectable for example by two vertical and one horizontal swipe gesture (downward, toward the left, downward) or by one vertical and one horizontal swipe gesture.

FIG. 11 shows an invisible keyboard 20 with a selected invisible key 22, the keys of which are arranged in the QWERTY layer. In accordance with this exemplary embodiment, letters can be selected and input. Proceeding from the invisible key 22 selected as standard, here once again having the letter D, the invisible keys are selectable by swipe gestures for example as follows:
Q: toward the left, toward the left, upward
A: toward the left, toward the left
Z: toward the left, toward the left, downward
T: toward the right, toward the right, upward
G: toward the right, toward the right
B: toward the right, toward the right, downward FIG. 12 shows a virtual keyboard 30 with virtual keys 31 and a selected virtual key 32, which are output visually on a touch-sensitive surface 44 of a multi-touchscreen. As previously, the touch-sensitive surface 44 may be smaller than a sensory surface or display area of the screen. Such a visual output can be operated alternately with the protected digit input as was described in the context of FIGS. 1 to 8. By way of example, firstly in the protected input mode a user can input a PIN having four or more digits, before said user attains the screen view shown in FIG. 12 by a suitable tap gesture. The selected virtual key 32 having a confirm functionality is preselected and is read aloud to the user by a screen reader function. The user could confirm this selection by a tap gesture, as a result of which for example the user's PIN input is sent.

By a swipe gesture 23 toward the right, however, the user in the example shown shifts the selection to the key having the cancel symbol, as shown in FIG. 13. The cancel function then selected is read aloud to the user by a screen reader function. The user then carries out a swipe gesture 23, downward, as a result of which the selection is shifted to the key having the telephone symbol. In accordance with FIG. 14, the user subsequently carries out a swipe gesture 23 toward the left, as a result of which the selection is located on the key having the printer symbol. In this way, with simple swipe gestures 23 the user can explore the content of the screen, wherein in each case the assignments or functions of the keys or buttons are read aloud to the user by voice synthesis.

Since the user in the example shown would like to make a printout, in FIG. 15 the user carries out a tap gesture 24 with two fingertips on the operating element 43, as a result of which the selection of the selected virtual key 32 having the printer symbol is confirmed.

If the user performs a swipe gesture which cannot be processed since, in the direction of the swipe gesture, there is no further virtual key 31 available for selection on the virtual keyboard 30, a specific acoustic or haptic signal which indicates this for the user can be output.

FIG. 16 shows a schematic illustration of one exemplary embodiment of the user interface for the protected input of characters. The construction substantially consists of three elements. A data processing unit 41 has a microprocessor, a memory and an operating program 200. Furthermore, it has an audio unit 14 with amplifier and loudspeaker, a vibration generator 13 for generating haptic signals, and also a display 12 or a graphics card for driving the latter. The audio unit 14 preferably has a headphone connection 140. Preferably, the user interface provides a possibility for setting the volume at the headphone connection 140. The operating program 200 is executed by the data processing unit 41. The data processing unit 41 has a communication interface 130 to further systems.

A further element of the user interface is a security module 42 comprising a second microcontroller 10 with a memory and a processor, on the one hand, and also a first microcontroller 11 for evaluating inputs which are reported to the first microcontroller 11 by an operating element 43 having a touch-sensitive surface via a first communication interface. The security module 42 contains a control program 220 stored on firmware. The first microcontroller 11 is connected to the second microcontroller 10 via a second communication interface 120. The communication interfaces 100, 110 or 120 can be embodied as a serial interface.

The second microcontroller 10 can be switched either into a clear text mode 52 or into a protected input mode 51. It is connected to the data processing unit 41 via an external communication interface 100, such that the operating program 200 on the data processing unit 41 can communicate with the control program 220 on the security module 42. The operating element 43 forwards touch inputs such as tap gestures or swipe gestures for example as (a multiplicity of) coordinates or vectors in a coordinate system to the first microcontroller 11. The operating element 43 can also coincide with the display 12 and be embodied as a multi-touchscreen.

The operating program 200 instigates screen outputs on the display 12, acoustic signals that are output by the audio unit 14, and haptic signals that are generated by the vibration generator 13. The operating program 200 essentially controls the user interface for sighted, visually impaired and blind persons who want to authenticate themselves for example for a service. In one possible application, a blind user authenticates himself/herself with a secret number in order to carry out a financial transaction. In this case, the authentication data are generated as an encrypted data set by the security module 42 and made available to the data processing unit 41.

FIG. 17 shows the basic sequence of the operating program 200 for such a PIN input and output. In this case, commands are sent from the data processing unit 41 to the security module 42 via the external communication interface 100.

After a start of the operating program 200, a security mode activation 300 is carried out by the operating program 200 notifying the security module 42 that the subsequent inputs via the operating element 43 are intended to be processed in the protected input mode 51. This has the consequence that coordinates or vectors of touches which are registered by the operating element 43 and evaluated by the first microcontroller 11 are not communicated to the data processing unit 41, but rather are internally processed by the second microcontroller 10 of the security module 42 and stored.

The next step involves a PIN input 310, wherein touch inputs of the user are processed and notifications are sent in each case to the data processing unit 41. However, such a notification does not give any information about the digits that have actually been input, but rather designates for example an event "input carried out". The data processing unit 41 can thereupon inform the user by generating and outputting for example an acoustic signal via the audio unit 14 or a haptic signal via the vibration generator 13. Preferably, the screen output via the display 12 is not activated in this case.

The next step involves a PIN encryption 320, which is instigated by the operating program 200 and carried out by the security module 42 and encrypts the authentication data that are input.

In the course of a PIN decryption 330, the PIN can be read out on the part of the data processing unit 41 after transmission via the external communication interface 100.

The control program 220 on the firmware of the security module 42 provides the correspondingly required functions of the security module 42 for the data processing unit 41 via the external communication interface 100. In the context of this exemplary embodiment, these include the evaluation of touch inputs performed by the user on the touch-sensitive surface of the operating element 43, the interpretation of said touch inputs as swipe gestures or tap gestures, the processing of the touch inputs for selecting digits on the invisible keyboard, the sending of notifications via the external communication interface 100 after each identified touch input, the storage of the digits that have been input in an internal security memory, the encryption of the digits that have been input using a cryptographic key, the transmission of the encrypted digits via the external communication interface 100, and the switchover between the clear text mode 52 and the protected input mode 51.

If the operating element 43 is embodied as multi-touch screen, the latter should be able to process at least two-finger gestures. Preferably, the data processing unit 41 has a voice synthesis module that can guide and support the user. The individual touch inputs can be acknowledged by acoustic or haptic signals. By way of example, tap gestures, double tap gestures, longer tapping and touching, scrolling, swipe gestures, etc. are appropriate as touch inputs.

The specific support for blind or visually impaired users can be activated automatically as soon as headphones are plugged into the headphone connection 140. Alternatively, the user interface can be configured for example such that touching and holding with a finger for three seconds in the top right corner of the screen activates the support mode for blind or visually impaired users. In this case, the standard mode of the user interface for processing touch inputs and gestures is changed over to an input mode with special assistance for blind and visually impaired persons, which supports specific gestures and acknowledges them with acoustic signals, such that blind users can operate the user interface conveniently and intuitively. In order to leave the special mode for supporting blind users, by way of example, the headphones can be unplugged from the headphone connection 140.

After the desired invisible key has been selected, the touch-sensitive surface of the operating element 43 can be doubly tapped with a finger, for example. This tap gesture activates the selected invisible key, as a result of which the assigned digit is input. Another suitable tap gesture is simple tapping with two fingertips in order to confirm the selected invisible key.

A further gesture can be reserved for changing back and forth between the protected input mode 51 for PIN input and a cleartext mode 52 for operating buttons. By way of example, double tapping with two fingertips is defined as a gesture for this purpose. As a result, the digit input is paused or ended and the focus is placed on buttons such as are shown for example in FIGS. 12 to 15. Such buttons are assigned for example the functions "delete all digits", "delete last digit", "confirm input" and "back".

On a payment terminal, the screen content represented by the display 12 is divided for example into different areas: a field with the amount to be paid, a field for the PIN input, and an area with the four buttons mentioned above for confirming or deleting the digits that have been input.

By suitable acoustic voice synthesis outputs, a blind user can be guided in conjunction with a screen reader functionality, which, however, does not read aloud the assignment of the invisible keys in the protected input mode. In the protected input mode, the assignment of the invisible key respectively selected is on no account permitted to be output to the user by voice synthesis, in order to ensure integrity and data protection during the PIN input.

However, by way of example, the following voice synthesis outputs may support the user in the overall sequence:
1. Please insert your card
2. Your card could not be recognized, please try again
3. Your card has been recognized; please tap twice on the screen to continue
4. The payment amount is $450.00; please tap twice with a finger to continue
5. Please enter the first/second/third/fourth/ . . . /last digit of your PIN
6. Please swipe toward the left, toward the right, upward, downward to select the next invisible key
7. Please tap twice to confirm the digit.

As soon as the user changes to the screen view shown in FIG. 12, the assignment or function of the selected virtual key 32 is read aloud for the user, for example "please confirm the transaction". This means that after each change to these control keys, the "confirm transaction" key selected as standard is once again read aloud for the user. After progressive selection of different buttons analogously to FIGS. 12 to 15, the following are suitable for example as outputs:
1. Please tap twice to continue
2. Please tap twice to cancel
3. Please tap twice to delete the last digit
4. Please tap twice to delete all digits
5. Please tap twice to return to the main menu In accordance with one exemplary embodiment, a user activates the support mode by plugging headphones into the headphone connection 140. The user thereupon acquires detailed information about the gestures supported. Optionally, a demonstration and training mode is provided which enables the user to familiarize himself/herself with the user interface.

After the user has inserted his/her card correctly, the payment amount is read aloud and finished with a voice output "please start the transaction". This voice output is repeated until the user has confirmed with a double tap that he/she would like to continue with the transaction. The invisible keyboard 20 from FIGS. 1 to 8 is thereupon activated, which allows the user to input his/her PIN in the protected input mode. An acoustic voice invitation invites the user to input the first digit.

Although the invention has been described and illustrated in detail by way of the preferred exemplary embodiment, the invention is not restricted by the disclosed examples and other variations can be derived herefrom by a person skilled in the art without departing from the scope of protection of the invention.

For the sake of clarity, it is to be understood that the use of 'a' or 'an' throughout this application does not exclude a plurality, and 'comprising' does not exclude other steps or elements.

The invention claimed is:

1. A user interface for the protected input of characters, comprising:
    an operating element having a touch-sensitive display surface, including one processor or a plurality of processors programmed:
        for providing a protected input mode, wherein the protected input mode prevents display on the touch-sensitive display surface and prevents operation of a screen reader function;
        for providing an invisible keyboard during the protected input mode, which defines an arrangement of invisible keys, exactly one of which is selected at each point in time,
            wherein the invisible keys are allocated respectively to a character which can be input by the respective invisible key, and
        for identifying a touch input which can be performed in the protected input mode as a swipe gesture in an arbitrary region on the touch-sensitive surface of the operating element,
        for selecting an invisible key which is arranged alongside the previously selected invisible key on the invisible keyboard in a direction analogous to a direction of the swipe gesture.

2. The user interface as claimed in claim 1, further wherein the processor or the processors is/are programmed:
    for identifying a touch input which can be performed in the protected input mode as a tap gesture in an arbitrary region on the touch-sensitive surface of the operating element, and
    for detecting the character allocated to the invisible key selected at the point in time of the tap gesture, and
    for inputting the detected character,
        wherein during the protected input mode, it is not possible to visually or acoustically output the currently selected invisible key and the inputted character.

3. The user interface as claimed in claim 2, comprising an audio unit and/or a vibration generator, and comprising a data processing unit programmed
    to output a first acoustic and/or haptic signal during or after the swipe gesture, which signal allows no conclusion to be drawn about the direction of the swipe gesture,
    to output a second acoustic and/or haptic signal during or after the tap gesture, which signal which allows no conclusion to be drawn about the detected character, and
    to output a third acoustic and/or haptic signal after a touch input which was not identified.

4. The user interface as claimed in claim 3,
    wherein the processor or one of the processors is programmed to maintain the previously selected invisible key after the identification of a swipe gesture, provided that no invisible key is arranged alongside the previously selected invisible key on the invisible keyboard in the direction analogous to the direction of the swipe gesture, and
    wherein the data processing unit is programmed to acknowledge said swipe gesture by outputting the third acoustic and/or haptic signal or a fourth acoustic and/or haptic signal.

5. The user interface as claimed in claim 2,
    wherein the processor or one of the processors is programmed to select a fixedly predefined key among the invisible keys as selected invisible key after each detection of a character.

6. The user interface as claimed in claim 5,
    wherein the invisible keys are arranged in four lines, wherein
        the digits 1, 2, 3 are allocated from left to right to three invisible keys in the topmost line,
        the digits 4, 5, 6 are allocated from left to right to three invisible keys in the second line,
        the digits 7, 8, 9 are allocated from left to right to three invisible keys in the third line, and
        the digit 0 is allocated to an invisible key situated in the bottommost line in a central position, and
    wherein the processor or one of the processors is programmed to select the invisible key to which the digit 5 is allocated as selected invisible key after each detection of a character.

7. The user interface as claimed in claim 6,
    wherein the invisible key to which the digit 0 is allocated can be selected by two successive swipe gestures downward, provided that the invisible key to which the digit 5 is allocated was selected previously.

8. The user interface as claimed in claim 1,
    wherein the swipe gestures are horizontal and vertical swipe gestures, or horizontal, vertical and diagonal swipe gestures, and
    wherein the invisible keys are arranged in a rectangular grid, such that horizontal, vertical or diagonal neighbors of the selected invisible key are uniquely determined.

9. The user interface as claimed in claim 1,
    wherein a first processor is programmed for identifying the touch input, and
    wherein a second processor is programmed for selecting the invisible key.

10. The user interface as claimed in claim 9,
    wherein the operating element is a keypad or a touchscreen,
    wherein the operating element processes touches with one or more fingertips as touch inputs and communicates them as coordinates or vectors in a coordinate system to the first processor.

11. The user interface as claimed in claim 9, comprising a security module, in which the first processor is arranged in a first microcontroller with a first communication interface, which connects the operating element to the first processor, and in which the second processor is arranged in a second microcontroller with a second communication interface, which connects the first processor to the second processor.

12. The user interface as claimed in claim 11, wherein the second processor is configured for a switchover between a clear text mode and the protected input mode, and is configured for an encryption of detected characters in the protected input mode.

13. The user interface as claimed in claim 12, wherein the security module has an external communication interface configured for communication with a data processing unit, wherein the second processor in the protected input mode is configured for sending a notification via the external communication interface after identification of a touch input by the first processor, storing detected characters in an internal security memory, encrypting detected characters using a cryptographic key, transmitting the encrypted characters via the external communication interface, and suppressing a transmission of coordinates or vectors of touch inputs via the external communication interface, and wherein the second processor in the clear text mode is configured for transmitting coordinates or vectors of touch inputs via the external communication interface.

14. The user interface as claimed in claim 13, comprising the data processing unit, which is programmed for switching over the second processor from the clear text mode to the protected input mode via the external communication interface, for outputting an acoustic or haptic signal upon receiving the notification via the external communication interface, and for suppressing a screen output while the second processor is in the protected input mode.

15. The user interface as claimed in claim 1, wherein the processor or the processors is/are programmed to perform the following steps:

a) identifying a first touch input which can be performed in the protected input mode as a first tap gesture in an arbitrary region on the touch-sensitive surface of the operating element, b) replacing the character allocated to the invisible key selected at the point in time of the first tap gesture by a character succeeding the character from a sequence of characters, wherein steps a) and b) are repeated until a desired character is identified;

c) identifying a second touch input which can be performed in the protected input mode as a second tap gesture in an arbitrary region on the touch-sensitive surface of the operating element, and for detecting the character allocated to the selected invisible key at the point in time of the second tap gesture.

16. An access system, a self-service terminal, a checkout system, a payment terminal, an automatic teller machine, a transfer terminal, an automated parcel station, a smartphone, a tablet, a laptop or a personal computer which has the user interface as claimed in claim 1.

17. A method for the protected input of characters, wherein an operating element has a touch-sensitive display surface, the method comprising:

providing, by at least one processor, a protected input mode, wherein the protected input mode prevents display of the touch sensitive display surface and prevents operation of a screen reader function, providing, by the at least one processor, an invisible keyboard during the protected input mode, which defines an arrangement of invisible keys, exactly one of which is selected at each point in time, wherein the invisible keys are allocated respectively a character which can be input by the respective invisible key, and wherein no visual or acoustic output of a position or assignment of the selected invisible key is provided during a protected input mode, identifying, by the at least one processor, a touch input which can be performed in the protected input mode as a swipe gesture in an arbitrary region on the touch-sensitive surface) of the operating element, and selecting by the at least one processor, an invisible key which is arranged alongside the previously selected invisible key on the invisible keyboard in a direction analogous to a direction of the swipe gesture.

18. The method as claimed in claim 17, further comprising:

identifying, by the at least one processor, a touch input which can be performed in the protected input mode as a tap gesture in an arbitrary region on the touch-sensitive surface of the operating element, detecting, by the at least one processor, the character allocated to the invisible key selected at the point in time of the tap gesture, and inputting, by the at least one processor, the detected character, wherein during the protected input mode, it is not possible to visually or acoustically output the currently selected invisible key and the inputted character.

19. The method as claimed in claim 18, further comprising:

outputting, by a data processing unit, a first acoustic and/or haptic signal during or after the swipe gesture (23), which signal allows no conclusion to be drawn about the direction of the swipe gesture, outputting, by a data processing unit, a second acoustic and/or haptic signal during or after the tap gesture (23), which signal allows no conclusion to be drawn about the detected character, and outputting, by a data processing unit, a third acoustic and/or haptic signal after a touch input which was not identified.

20. The method as claimed in claim 19, further comprising:

maintaining, by the at least one processor, the previously selected invisible key after identification of a swipe gesture, provided that no invisible key is arranged alongside the previously selected invisible key on the invisible keyboard in the direction analogous to the direction of the swipe gesture, and acknowledging, by the data processing unit, said swipe gesture by outputting the third acoustic and/or haptic signal or a fourth acoustic and/or haptic signal.

21. The method as claimed in claim 18, further comprising:
selecting, by the at least one processor, a fixedly predefined key among the invisible keys as selected invisible key after each detection of a character.

22. The method as claimed in claim 21, further comprising:
wherein the invisible keys are arranged in four lines, wherein
the digits 1, 2, 3 are allocated from left to right to three invisible keys in the topmost line,
the digits 4, 5, 6 are allocated from left to right to three invisible keys in the second line,
the digits 7, 8, 9 are allocated from left to right to three invisible keys in the third line, and
the digit 0 is allocated to an invisible key situated in the bottommost line in a central position, and
selecting the invisible key to which the digit 5 is allocated as selected invisible key after each detection of a character.

23. The method as claimed in claim 22,
wherein the invisible key to which the digit 0 is allocated can be selected by two successive swipe gestures downward, provided that the invisible key to which the digit 5 is allocated was selected previously.

24. The method as claimed in claim 17,
wherein the swipe gestures are horizontal and vertical swipe gestures, or horizontal, vertical and diagonal swipe gestures, and
wherein the invisible keys are arranged in a rectangular grid, such that horizontal, vertical or diagonal neighbors of the selected invisible key are uniquely determined.

25. The method as claimed in claim 17, further comprising:
identifying, by a first processor, the touch input, and
selecting, by a second processor, the invisible key.

26. The method as claimed in claim 25, further comprising:
wherein the operating element is a trackpad or a touchscreen,
processing, by the operating element, touches with one or more fingertips as touch inputs and communicating them as coordinates or vectors in a coordinate system to the first processor.

27. The method as claimed in claim 25, further comprising:
switching the second processor between a clear text mode and the protected input mode, and
encrypting characters detected in the protected input mode.

28. The method as claimed in claim 27, further comprising:
sending, by the second processor in the protected input mode, a notification via an external communication interface after identification of a touch input by the first processor,
storing, by the second processor in the protected mode, detected characters in an internal security memory,
encrypting, by the second processor in the protected mode, detected characters using a cryptographic key,
transmitting, by the second processor in the protected mode, the encrypted characters via the external communication interface, and
suppressing, by the second processor in the protected mode, a transmission of coordinates or vectors of touch inputs via the external communication interface, and
transmitting, by the second processor in the clear text mode, coordinates or vectors of touch inputs via the external communication interface.

29. The method as claimed in claim 28, further comprising:
switching, by a data processing unit, the second processor from the clear text mode to the protected input mode via the external communication interface,
outputting, by the data processing unit, an acoustic or haptic signal upon receiving the notification via the external communication interface, and
suppressing, by the data processing unit, a screen output while the second processor is in the protected input mode.

30. The method as claimed in claim 17, further comprising:
a) identifying, by the at least one processor, a first touch input which can be performed in the protected input mode as a first tap gesture in an arbitrary region on the touch-sensitive surface of the operating element,
b) replacing, by the at least one processor, the character allocated to the invisible key selected at the point in time of the first tap gesture by a character succeeding the character from a sequence of characters, wherein steps a) and b) are repeated until a desired character is identified,
c) identifying, by the at least one processor, a second touch input which can be performed in the protected input mode as a second tap gesture in an arbitrary region on the touch-sensitive surface of the operating element, and
d) detecting, by the at least one processor, the character allocated to the selected invisible key at the point in time of the second tap gesture.

31. A computer-readable medium,
on which is stored a computer program product, comprising a computer readable hardware storage device having computer readable program code stored therein, said program code executable by a processor of a computer system to implement a method which performs the method as claimed in claim 17 when it is processed in one processor or a plurality of processors.

32. A computer program product, comprising a computer readable hardware storage device having computer readable program code stored therein, said program code executable by a processor of a computer system to implement a method which is processed in one processor or a plurality of processors and in the process performs the method as claimed in claim 17.

* * * * *